US012675692B2

(12) United States Patent
Okawa et al.

(10) Patent No.: US 12,675,692 B2
(45) Date of Patent: Jul. 7, 2026

(54) LEARNING METHOD, LEARNING APPARATUS AND PROGRAM

(71) Applicant: NTT, Inc., Tokyo (JP)

(72) Inventors: Maya Okawa, Tokyo (JP); Hiroyuki Toda, Tokyo (JP)

(73) Assignee: NTT, Inc., Tokyo (JP)

( * ) Notice: Subject to any disclaimer, the term of this patent is extended or adjusted under 35 U.S.C. 154(b) by 784 days.

(21) Appl. No.: 18/007,696

(22) PCT Filed: Jun. 8, 2020

(86) PCT No.: PCT/JP2020/022567
§ 371 (c)(1),
(2) Date: Dec. 1, 2022

(87) PCT Pub. No.: WO2021/250753
PCT Pub. Date: Dec. 16, 2021

(65) Prior Publication Data
US 2023/0316070 A1 Oct. 5, 2023

(51) Int. Cl.
*G06N 3/08* (2023.01)
(52) U.S. Cl.
CPC ..................................... *G06N 3/08* (2013.01)
(58) Field of Classification Search
None
See application file for complete search history.

(56) References Cited

U.S. PATENT DOCUMENTS

2017/0103172 A1* 4/2017 Fink ....................... G16H 50/20

OTHER PUBLICATIONS

Mei et al.. "The neural hawkes process: A neurally self-modulating multivariate point process." Advances in neural information processing systems 30 (Year: 2017).*
Omi, Takahiro, and Kazuyuki Aihara. "Fully neural network based model for general temporal point processes." Advances in neural information processing systems 32, (Year: 2019).*
Rizoiu et al. (2017) "A tutorial on hawkes processes for events in social media" arXiv preprint arXiv:1708.06401.
Ogata, Yosihiko (1981) "On Lewis' simulation method for point processes" IEEE Transactions on Information Theory, 27.1: pp. 23-31.

* cited by examiner

*Primary Examiner* — Kannan Shanmugasundaram

(57) ABSTRACT

A learning method to be executed by a computer according to one embodiment includes of acquiring event history information representing a history of a predetermined event; and training, by using the acquired event history information, parameters of an intensity function in which a trigger function is set to be a function represented by a composite function of a first function and a predetermined second function; and a derivative of the first function, the first function being represented by a neural network that models a temporal change in influence of the event.

16 Claims, 5 Drawing Sheets

Fig. 1

| EVENT OCCURRENCE TIME POINT |
| --- |
| 2017/8/22 11:30 |
| 2017/8/22 12:11 |
| ⋮ |
| 2017/9/30 23:43 |

LEARNING METHOD, LEARNING APPARATUS AND PROGRAM

CROSS-REFERENCE TO RELATED APPLICATIONS

This application is a U.S. National Stage Application filed under 35 U.S.C. § 371 claiming priority to International Patent Application No. PCT/JP2020/022567, filed on 8 Jun. 2020, the disclosure of which is hereby incorporated herein by reference in its entirety.

TECHNICAL FIELD

The present invention relates to a learning method, a learning apparatus, and a program.

BACKGROUND ART

The technology of predicting a future event by modeling events with propagation properties has been studied in the past. Here, propagation refers to, for example, the spreading (sharing) of content in a social networking service (SNS), the spread of infectious diseases, etc. In addition, an event refers to, for example, the act of sharing content in an SNS, the onset of an infectious disease, etc.

A Hawkes process is commonly used to model events with propagation properties (e.g., PTL 1). The Hawkes process is a kind of stochastic process called "point process". In the framework of a point process, a function called "intensity" is usually assumed to represent the probability of occurrence of an event.

In the Hawkes process, intensity is described as the cumulative sum of the influences of past events. Further, at that time, the influence of an individual event is modeled by a function called "trigger function".

CITATION LIST

Non Patent Literature

[NPL 1] RIZOIU, Marian-Andrei, et al. A tutorial on hawkes processes for events in social media. arXiv preprint arXiv: 1708.06401, 2017.

SUMMARY OF THE INVENTION

Technical Problem

Incidentally, the conventional technology described in NPL 1 given above makes a strong assumption that the influences of past events do not change with time. In other words, it is assumed that the shape of the trigger function is constant regardless of absolute time point.

However, in real-world applications, the mode of propagation is considered to change with time depending on the internal state of a recipient of an event. For example, propagation in an SNS is considered to fluctuate periodically depending on the level of human activity. Specifically, the influence of an individual event is considered to be larger (i.e., the intensity of propagation is stronger) during the daytime, and the influence of an individual event is considered to be smaller during the night time. As a result, the accuracy of predicting an event may deteriorate in the conventional technology.

One embodiment of the present invention has been made in view of the above-mentioned problems, and has an object to construct a point process model capable of predicting occurrence of an event with high accuracy.

Means for Solving the Problem

In order to achieve the above-mentioned object, a learning method to be executed by a computer according to one embodiment includes acquiring event history information representing a history of a predetermined event; and training, by using the acquired event history information, parameters of an intensity function in which a trigger function is set to be a function represented by a composite function of a first function, and a predetermined second function and a derivative of the first function, the first function being represented by a neural network that models a temporal change in influence of the event.

Effects of the Invention

It is possible to construct a point process model capable of predicting occurrence of an event with high accuracy.

BRIEF DESCRIPTION OF DRAWINGS

FIG. 1 is a diagram illustrating an example of event history information.

DESCRIPTION OF EMBODIMENTS

Figure 2:
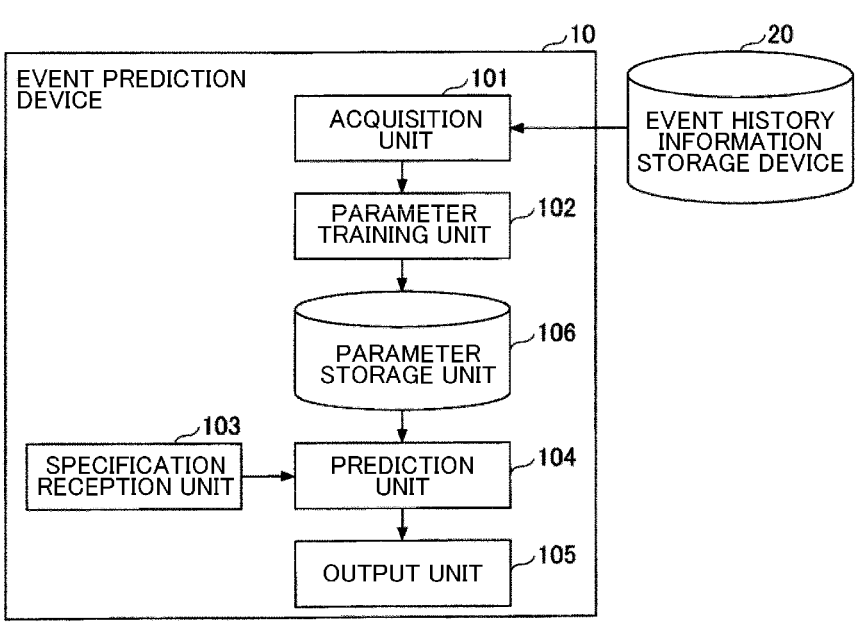
FIG. 2 is a diagram illustrating an example of the overall configuration of an event prediction device.

In the following, one embodiment of the present invention is described. This embodiment describes an event prediction device 10 that constructs a point process model capable of predicting occurrence of an event with high accuracy, and predicts occurrence of an event by using the point process model.

Here, the point process model is generally described by a function called "intensity function" (or "strength function"), which represents the probability of occurrence of an event. In the Hawkes process, this intensity function is modeled by a function called "trigger function". In this embodiment, the trigger function is rewritten to a function that depends on absolute time point, to thereby extend the point process model so as to be capable of taking into account the temporal change in influence of a past event. As a result, it is possible to predict occurrence of a future event with high accuracy even when the influence of an event (i.e., mode of propagation) changes with time.

<Theoretical Configuration>

First, the theoretical configuration of this embodiment is described. In this embodiment, it is assumed that event history information D representing the history of events from time point $t_1$ to time point $t_N$ is given. Specific examples of the event history information D include, for example, data representing the history of the act of spreading content in an SNS, data representing the history of infection of an infectious disease, and other types of data. Here, the event history information is data that indicates the history of an event, and is represented by a combination $(t_i, m_i)$ of a time point $t_i$, which indicates the time point of occurrence of an event, and auxiliary information $m_i$ at the time point $t_i$. The auxiliary information is, for example, the user ID of an SNS in the case of the history of the act of spreading content on the SNS, or the type of disease and the profile of an infected person in the case of the history of infection of an infectious disease. N is the number of events included in the event history information D.

In this embodiment, for the simplicity of description, it is assumed that only the history of event occurrence time points is given as the event history information. In other words, it is assumed that the event history information D is represented by $\{t_1, \ldots, t_N\}$. A specific example of the event history information D is illustrated in FIG. 1. As illustrated in FIG. 1, the date and time may be used for each time point $t_i$. This embodiment can be applied in the same way when auxiliary information is given.

In this embodiment, the given event history information D is used to train the parameters of the point process model.

First, an intensity function is designed in accordance with the procedure of a general point process model. The intensity function is a function that represents the probability of an event occurring per unit time. When the intensity function that represents the probability of an event occurring at a time point t is represented by $\lambda(t)$, the intensity function $\lambda(t)$ may be represented by the following expression (1), for example.

[Math. 1]

$$\lambda(t) = \mu + \sum_{t_j < t} h(\Delta_j) \tag{1}$$

In the above expression, $\Delta_j \equiv t - t_j$ is defined. Further, $\mu$ is called "background rate", and represents the probability of an event occurring independent of the influences of past events. In this embodiment, for the simplicity of description, a time-invariant constant $\mu$ is used, but this embodiment can also be easily generalized to a case where $\mu$ varies with the time point t.

The second term in the above expression (1) is a term representing the influence of a past event. $h(\cdot)$ is a trigger function, which usually depends only on a difference $\Delta_j$ between the time point $t_j$ of occurrence of a past event and the current time point t. For example, an exponential decay function, a Weibull distribution, a gamma distribution, and other functions are widely used as the trigger function. In this embodiment, the trigger function $h(\Delta_j|t)$ at the time point t is modeled by the following expression (2) by using a time conversion function f(t).

[Math. 2]

$$h(\Delta_j|t) = g(f(\Delta_j))\frac{d}{d\Delta_j}f(\Delta_j) \tag{2}$$

In the above expression, $f(\Delta_j)$ is represented by the following expression (3).

[Math. 3]

$$f(\Delta_j) = \int_{t_j}^{t} a(u)du \tag{3}$$

$g(\cdot)$ is the trigger function (i.e., exponential decay function, Weibull distribution, gamma distribution, etc.) used in an existing Hawkes process model. a(t) is any black box function representing a temporal change in influence of an event. In this embodiment, a(t) is modeled by a neural network (that is, f(t) is a function represented by a neural network (hereinafter referred to as "neural network function")). In this way, it is possible to write down a likelihood function by using only the neural network function f(t) and the derivative of f with respect to $\Delta_j$.

Specifically, in this embodiment, the likelihood function L can be written down as the following expression (4).

[Math. 4]

$$\begin{aligned}
\mathcal{L} &= \sum_{n=1}^{N}\log\lambda(t_n) - \int_0^T \lambda(t)dt \\
&= \sum_{n=1}^{N}\log\left(\mu + \sum_{t_j < t_n} g(f(\Delta_j))\frac{d}{d\Delta_j}f(\Delta_j)\right) - \mu T - \\
&\quad \sum_{n=1}^{N}(G(f(T - t_n)) - G(f(-t_n)))
\end{aligned} \tag{4}$$

An integral interval [0, T] in the above expression (4) is, for example, a time interval in which the event history information D is collected, which satisfies $[t_1, t_N] \subseteq [0, T]$. In addition, $G(\cdot)$ is a primitive function (one of primitive functions) of $g(\cdot)$, and is defined by the following expression (5).

[Math. 5]

$$G(f) = \int g(f)df \tag{5}$$

The integral shown in the expression (5) can be solved analytically for many $g(\cdot)$ such as the exponential decay function, the Weibull distribution, and the gamma distribution.

Then, at the time of training, the parameters of the neural network function $f(\cdot)$ are estimated so as to minimize the likelihood L shown in the above expression (4). Any known optimization method can be used to optimize the parameters. The likelihood L shown in the above expression (4) is differentiable with respect to all the parameters, and thus the parameters can be optimized by using a gradient method, for example. The derivative of the likelihood L can be calculated by using a back propagation method, for example.

<Overall Configuration>

Next, the overall configuration of the event prediction device 10 according to this embodiment is described with reference to FIG. 2. FIG. 2 is a diagram illustrating an example of the overall configuration of the event prediction device 10 according to this embodiment.

As illustrated in FIG. 2, the event prediction device 10 according to this embodiment includes an acquisition unit 101, a parameter training unit 102, a specification reception unit 103, a prediction unit 104, an output unit 105, and a parameter storage unit 106.

The acquisition unit 101 acquires the event history information D from an event history information storage device 20, which is connected to the event prediction device 10 via a communication network.

The event history information storage device 20 is, for example, a web server or database server that stores the event history information. The event history information stored in the event history information storage device 20 may be operated (registered, deleted, modified, etc.) by using, for example, a terminal (this terminal may be the event prediction device 10 or the event history information storage device 20 itself) connected to the event history information storage device 20 via the communication network.

The parameter training unit 102 uses the event history information D acquired by the acquisition unit 101 to calculate the parameters (i.e., the parameters of the neural network function f(t) embedded in the intensity function $\lambda(t)$) of the intensity function $\lambda(t)$ shown in the above expression (1). At this time, the parameter training unit 102 trains the parameters by minimizing the likelihood L shown in the above expression (4) by using any known optimization method (e.g., gradient method). The parameters trained by the parameter training unit 102 (trained parameters) are stored into the parameter storage unit 106.

The specification reception unit 103 receives specification of a prediction time point when occurrence of an event is predicted by using the intensity function $\lambda(t)$ with the set trained parameters. For example, information other than the time point may be received depending on the type or the like of an event (as a specific example, specification of information indicating a location such as a region may be received in addition to the time point in the case of predicting an outbreak of an infectious disease).

The prediction unit 104 uses the intensity function $\lambda(t)$ with the set trained parameters to predict occurrence of an event at the time point received by the specification reception unit 103. At this time, the prediction unit 104 predicts occurrence of an event by, for example, calculating the probability of occurrence of an event up to the prediction time point by using the intensity function $\lambda(t)$, and performing point process simulation. There are various kinds of methods for performing point process simulation, and for example, a method called "thinning" can be used. Refer to, for example, a reference document "OGATA, Yosihiko. On Lewis' simulation method for point processes. IEEE Transactions on Information Theory, 1981, 27.1: 23-31." and other documents for thinning.

The output unit 105 outputs a result of prediction by the prediction unit 104. The output unit 105 may output the output result to any output destination. For example, the output unit 105 may display the prediction result on a display or the like, store the prediction result into a storage area such as an auxiliary storage device, print the prediction result from a printer or the like, output the prediction result as sound from a speaker or the like, or transmit the prediction result to an external device via the communication network.

The configuration of the event prediction device 10 illustrated in FIG. 2 is only one example, and may be other configurations. For example, instead of acquiring the event history information from the event history information storage device 20, the event prediction device 10 may hold these pieces of event history information. Further, for example, the event prediction device 10 may include a device that executes parameter training processing described later and a device that executes prediction processing described later.

<Parameter Training Processing>

Figure 3:
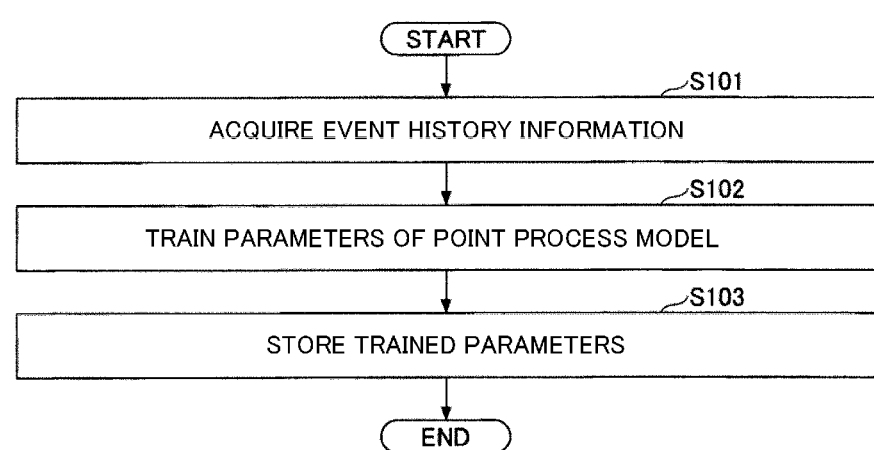
FIG. 3 is a flowchart illustrating an example of parameter training processing according to this embodiment.

Next, a flow of the processing of training the parameters of the intensity function $\lambda(t)$ (i.e., the parameters of the neural network function f(t)) shown in the above expression (1) is described with reference to FIG. 3. FIG. 3 is a flow chart illustrating an example of the parameter training processing according to this embodiment.

First, the acquisition unit 101 acquires the event history information D from the event history information storage device 20 (Step S101). At this time, the user of the event prediction device 10 may specify a range (e.g., temporal range, location range, etc.) to be acquired as the event history information D, for example.

Next, the parameter training unit 102 trains the parameters of the intensity function $\lambda(t)$ shown in the above expression (1) by using the event information D acquired in Step S101 described above (Step S102). At this time, the parameter training unit 102 trains the parameters of the intensity function $\lambda(t)$ shown in the above expression (1) by minimizing the likelihood L shown in the above expression (4) through use of any known optimization method.

Then, the parameter training unit 102 stores the parameters (trained parameters) trained in Step S102 described above into the parameter storage unit 106 (Step S103). As a result, it possible to predict occurrence of a future event with high accuracy by using the intensity function $\lambda(t)$ with the set trained parameters even when the influence of an event (i.e., mode of propagation) changes with time.

<Prediction Processing>

Figure 4:
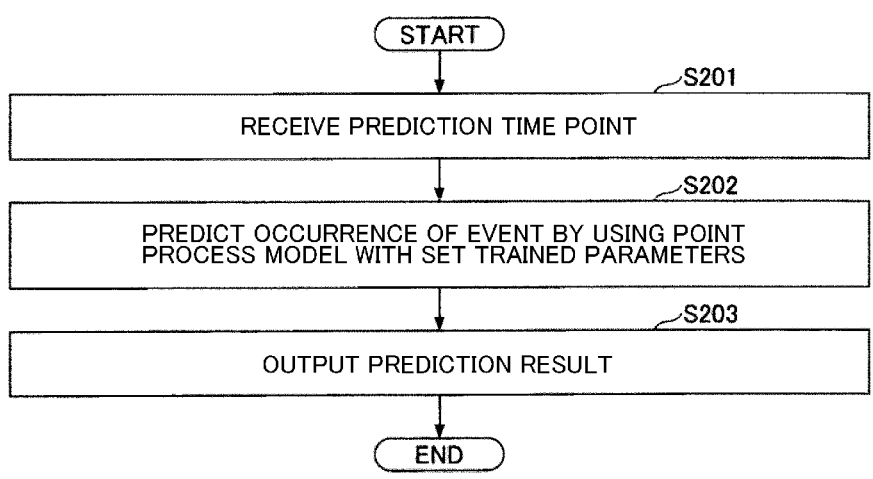
FIG. 4 is a flow chart illustrating an example of prediction processing according to this embodiment.

Next, a flow of the processing of predicting occurrence of an event by using the intensity function $\lambda(t)$ with the set trained parameters is described with reference to FIG. 4. FIG. 4 is a flow chart illustrating an example of the prediction processing according to this embodiment.

First, the specification reception unit 103 receives specification of the prediction time point (Step S201). The prediction time point can be specified by the user on a user interface (UI) displayed on the display of the event prediction device 10, for example.

Next, the prediction unit 104 predicts occurrence of an event at the time point received in Step S201 described above by using the intensity function $\lambda(t)$ with the set trained parameters stored in the parameter storage unit 106 (Step S202).

Then, the output unit 105 outputs the result of prediction in Step S202 described above to a predetermined output destination (Step S203).

<Hardware Configuration>

Figure 5:
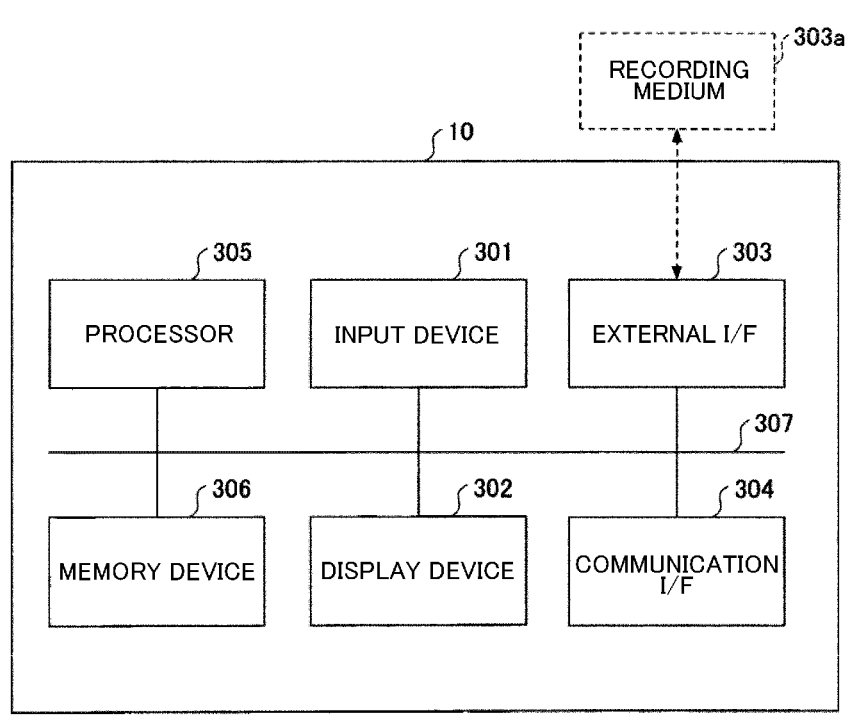
FIG. 5 is diagram illustrating an example of the hardware configuration of the event prediction device according to this embodiment.

Finally, the hardware configuration of the event prediction device 10 according to this embodiment is described with reference to FIG. 5. FIG. 5 is diagram illustrating an example of the hardware configuration of the event prediction device 10 according to this embodiment.

As illustrated in FIG. 5, the event prediction device 10 according to this embodiment is realized by a general computer or computer system, and includes an input device 301, a display device 302, an external I/F 303, a communication I/F 304, a processor 305, and a memory device 306. These pieces of hardware are communicably connected to one another via a bus 307.

The input device 301 is, for example, a keyboard, a mouse, a touch panel, or the like. The display device 302 is, for example, a display or the like. The event prediction device 10 may not include at least one of the input device 301 and the display device 302.

The external I/F 303 is an interface with an external device. The external device includes a recording medium 303a or the like. The event prediction device 10 can read/write data from/to the recording medium 303a via the external I/F 303. The recording medium 303a may store, for example, one or more programs for realizing each functional unit (acquisition unit 101, parameter training unit 102, specification reception unit 103, prediction unit 104, output unit 105, etc.) included in the event prediction device 10.

The recording medium 303*a* is, for example, a compact disc (CD), a digital versatile disk (DVD), an Secure Digital (SD) memory card, a Universal Serial Bus (USB) memory card, etc.

The communication I/F 304 is an interface for connecting the event prediction device 10 to the communication network. The event prediction device 10 can acquire the event history information from the event history information storage device 20 via the communication I/F 304. One or more programs that realize each functional unit of the event prediction device 10 may be acquired (downloaded) from a predetermined server device or the like via the communication I/F 304.

The processor 305 is, for example, a central processing unit (CPU), a graphics processing unit (GPU), or other various arithmetic devices. Each functional unit of the event prediction device 10 is realized by one or more programs stored in the memory device 306 or the like causing the processor 305 to execute processing.

The memory device 306 is, for example, a hard disk drive (HDD), a solid state drive (SSD), a random access memory (RAM), a read only memory (ROM), a flash memory, or other various storage devices. The parameter storage unit 106 of the event prediction device 10 can be realized by using the memory device 306.

The event prediction device 10 according to this embodiment has the hardware configuration illustrated in FIG. 5, to thereby be able to realize the parameter training processing and prediction processing described above. The hardware configuration illustrated in FIG. 5 is only one example, and the event prediction device 10 may have other hardware configurations. For example, the event prediction device 10 may include a plurality of processors 305, or may include a plurality of memory devices 306.

The present invention is not limited to the above-mentioned embodiment serving as a specific disclosure, and various modifications, changes, combinations with known technologies, etc. are conceivable without departing from the scope of the claims.

REFERENCE SIGNS LIST

10 Event prediction device
20 Event history information storage device
101 Acquisition unit
102 Parameter training unit
103 Specification reception unit
104 Prediction unit
105 Output unit
106 Parameter storage unit

The invention claimed is:

1. A computer-implemented method for training a model, comprising:

acquiring event history information representing a history of a predetermined event, wherein the event history information comprises a set of timestamps indicating occurrences of a past event of a predetermined type over time, and the model comprises an intensity function; and training, by using the acquired event history information, parameters of the intensity function of the model by setting a trigger function as a part of the intensity function, wherein the trigger function comprises a composite function of a first function and a predetermined second function, the trigger function is represented by a product of $g(f(\Delta_i))$ and the derivative of the first function f with respect to $\Delta_i$, where $\Delta_i = t - t_i$ denotes a difference between a time point $t_i$ of occurrence of the past event in the past and a current time point t, f denotes the first function, and g denotes the second function, the first function comprises a neural network that describes a temporal change of influence of the occurrences of the past event of the predetermined type, the trigger function further comprises a derivative of the first function, and the trigger function represents a part of describing a likelihood of the occurrences of the past event over time according to the event history information.

2. The computer-implemented method according to claim 1, wherein the training further comprises minimizing a likelihood comprising the first function and the derivative of the first function.

3. The computer-implemented method according to claim 1, wherein the first function f represents a function that integrates a function a in an interval $[t_j, t]$, where the function a represents the temporal change of the influence of the occurrences of the past event of the predetermined type.

4. The computer-implemented method according to claim 1, wherein the second function represents an exponential decay function, a Weibull distribution, or a gamma distribution.

5. A learning apparatus, comprising:

a processor; and a memory storing program instructions that cause the processor to:

acquire event history information representing a history of a predetermined event, wherein the event history information comprises a set of timestamps indicating occurrences of a past event of a predetermined type over time, and the model comprises an intensity function; and train, by using the acquired event history information, parameters of the intensity function of the model by setting a trigger function as a part of the intensity function, wherein the trigger function comprises a composite function of a first function and a predetermined second function, the trigger function is represented by a product of $g(f(\Delta_i))$ and the derivative of the first function f with respect to $\Delta_i$, where $\Delta_i = t - t_i$ denotes a difference between a time point $t_i$ of occurrence of the past event in the past and a current time point t, f denotes the first function, and g denotes the second function, the first function comprises a neural network that describes a temporal change of influence of the occurrences of the past event of the predetermined type, the trigger function further comprises a derivative of the first function, and the trigger function represents a part of describing a likelihood of the occurrences of the past event over time according to the event history information.

6. A non-transitory computer-readable storage medium that stores therein a program for causing a computer to execute the computer-implemented method according to claim 1.

7. The computer-implemented method according to claim 1, wherein the model after trained predicts, based on input time, an occurrence of an event of the predetermined type.

8. The computer-implemented method according to claim 1, further comprising:

predicting, based on input time, by the model after trained, an occurrence of an event of the predetermined type.

9. The computer-implemented method according to claim 1, wherein the event history information further comprises user information, and the model after trained predicts, based on input time and input user information, an occurrence of an event of the predetermined type by a user as described by the user information.

10. The computer-implemented method according to claim 1, wherein the predetermined type represents inflection of an infectious disease.

11. The computer-implemented method according to claim 1, wherein the predetermined type represents an act of spreading content on a social network service.

12. The learning apparatus according to claim 5, wherein the model after trained predicts, based on input time, an occurrence of an event of the predetermined type.

13. The learning apparatus according to claim 5, the program instructions further cause the processor to:

predict, based on input time, by the model after trained, an occurrence of an event of the predetermined type.

14. The learning apparatus according to claim 5, wherein the event history information further comprises user information, and the model after trained predicts, based on input time and input user information, an occurrence of an event of the predetermined type by a user as described by the user information.

15. The learning apparatus according to claim 5, wherein the predetermined type represents inflection of an infectious disease.

16. The learning apparatus according to claim 5, wherein the predetermined type represents an act of spreading content on a social network service.

* * * * *